Feb. 6, 1934.   C. J. HARBERT   1,945,809
PIGMENT COMPOSITION
Filed May 23, 1932
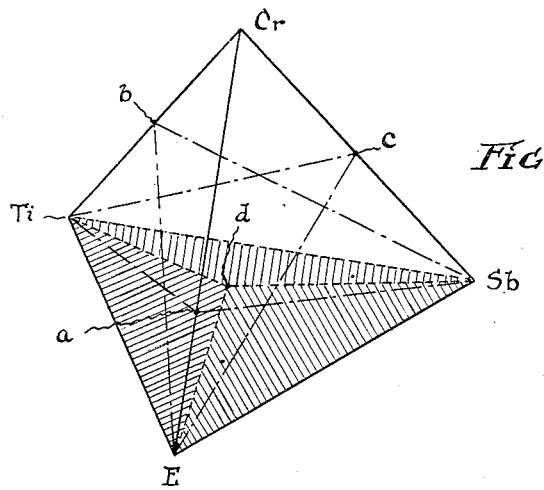
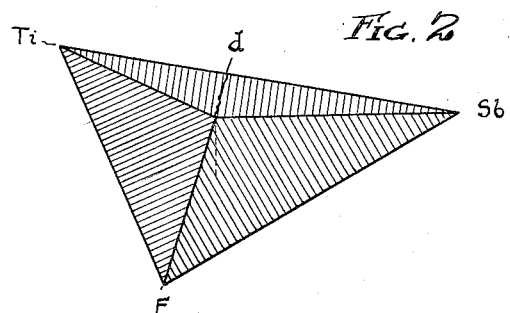
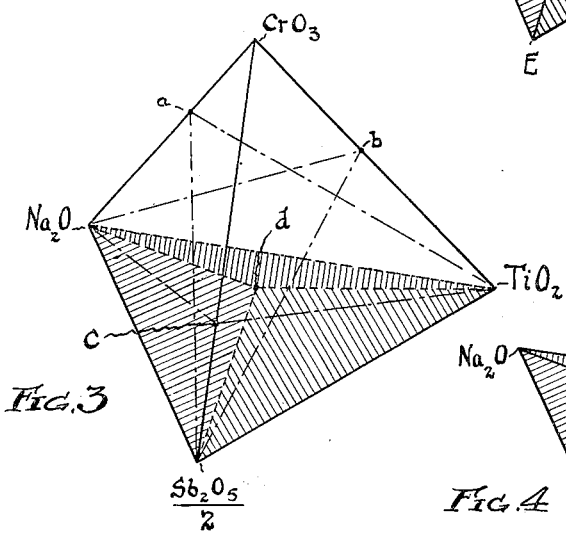
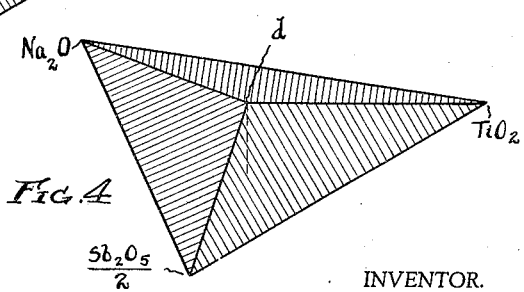
INVENTOR.
Carl J. Harbert
BY
Fay, Oberlin & Fay
ATTORNEYS.

Patented Feb. 6, 1934

1,945,809

UNITED STATES PATENT OFFICE 1,945,809

PIGMENT COMPOSITION

Carl J. Harbert, Cleveland Heights, Ohio, assignor to The Harshaw Chemical Company, Cleveland, Ohio, a corporation of Ohio Application May 23, 1932. Serial No. 612,924

15 Claims. (Cl. 134—58)

While there is no great difficulty in making pigments suitable for paints and the like, pigments which are capable of enduring the drastic conditions encountered in ceramic ware are few, and those which are capable of standing up under conditions of mixture in ceramic body material are particularly scarce. In order that any pigment be suitable for ceramic body color, it must be stable at the high temperatures, and under the prolonged firing conditions must not react harmfully with the ceramic body. Even in the field of pigments applicable in cement, rubber, paints, etc., a yellow pigment that will not bleach under the action of weather, or darken in the presence of sulphur compounds, is not commonly available, and in particular, there is no common pigment of yellow color capable of usage in the more drastic conditions encountered in the ceramic industry. In accordance with the present invention however, there is now made possible a pigment which is of a brilliant yellow color, and whose shade may be varied through a range from light yellow to orange, brown to olive, if desired, the pigment being insoluble in water, acids and alkalis, and being extremely inert to most chemical reagents even at high temperatures, besides having excellent opacity and covering power.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Fig. 1 is a graphic showing of a four-component system, in the form of a solid tetrahedron in isometric projection, the volume of the included tetrahedron in shading representing proportions desirable; Fig. 2 shows the shaded portion separated; and Figs. 3 and 4 are analogous views, illustrating particular compound ranges.

In accordance with the invention, a pigment is made up by reaction of the oxides or oxygen containing compounds of titanium, antimony, chromium and an element which is electro-positive to the aforementioned constituents at high temperatures. These components may be provided in convenient form as compounds of the respective elements, titanium being conveniently introduced for instance as titanium dioxide or other source-materials, as rutile, titanium lithopone, etc.; antimony being conveniently introduced for instance as antimony trioxide, antimony tetroxide, antimony pentoxide, an antimonite or antimonate, etc.; and chromium being introduced conveniently for instance in the form of chromium trioxide, chormic acid, chromium oxide ($Cr_2O_3$), chromates, dichromates, etc. The electro-positive element may be sodium, potassium, or in some instances calcium, strontium, barium, magnesium, aluminum, zinc, tin, silver, lead, nickel, cobalt, lanthanum, cadmium, etc. In those cases where such element has a natural color of its own, the yellow color of the resultant pigment is correspondingly modified by the presence of such element. Where the pigment is to be employed in ceramics, the electro-positive element may in some instances be supplied by an available base, as sodium, lime, etc., in the clay or body material. Most usually however, the entire four components are made up as such, and the pigment thus completed is incorporated in the material which is to be colored.

As indicated, the precise color may be varied somewhat by varying the relative proportions of the components, and a choice is thus available in this respect, although most usually a bright yellow is the desirable form, and variations from this toward the lighter shade or toward the darker shade fall within a general range which for practical purposes will be pointed out more in detail hereinafter. The titanium, as indicated, is essential as a constituent to the making of the color, and an excess acts as a refractory base for the color, preventing fusion and shrinkage, and stabilizing the color. The chromium, irrespective of its valence condition as originally introduced, is oxidized in the air and in the presence of the electro-positive element to the hexavalent state. The shade and intensity of the color are changed more by variation of the chromium than by variation of any of the other constituents. For a desirable color, in general the molecular ratio of chromium to antimony may be for instance equal to or less than 1, and the molecular ratio of chromium to titanium equal to or less than 1, and the molecular ratio of chromium to electro-positive element equal to or less than 1 atomic weight of chromium to two hydrogen equivalents of the electro-positive element. Within such general limits, and with the other constituents in constant ratio, an increase in chromium causes an increase in the strength and darkening of the color, and similarly with the other constituents in constant ratio an increase in antimony decreases the strength and lightens the color, and similarly with the other constituents in a constant ratio, an increase in the electro-positive element decreases the strength and lightens the color. High amounts of alkali metal as the electro-positive element tends to cause sintering with consequent darkening of the color, but high amounts of such elements as aluminum, calcium, which do not readily cause sintering, merely serve to dilute the color. A stronger color is obtained by the use of non-sintering electro-positive elements in general, than with those which sinter quite readily. For instance, calcium is advantageous in this respect compared with sodium. The pigment may be made up by mixing the constituents intimately, and then calcining in an oxidizing atmosphere to the development of the color. Intimate mixing is facilitated by making up with water or the like. A temperature above 800° C. is in general advantageous. Instead of mixing all of the components, where desired at least one of the components may be mixed in with ceramic raw materials and these be formed into a desired ceramic article, which may be fired and then dipped in a slip or suspension containing the remainder of the pigment ingredients and then be finally fired. Or the ingredients for the pigment may be mixed up with the ceramic body material, the desired ceramic articles being formed, as table-ware, etc., then being fired, and then being coated with a transparent slip or glaze, and finally being fired. In this manner, a clear yellow body, as heretofore unavailable, may be obtained. Again, the pigment may be made up in a slip or suspension with ceramic materials, and be applied purely as a coating on an uncolored body, or body of different color.

In the diagram shown in Fig. 1, there is illustrated in graph-form a tri-dimensional showing of the manner in which the four component mixture ranges in tetrahedral form. The base of the tetrahedron is the zero plane for chromium, and the amount of chromium, molecularly, increases toward the apex $Cr$. In similar manner, the plane or side E—Sb—Cr is the zero plane for titanium, and the amount of titanium increases toward the apex $Ti$. Similarly, the plane or side $Cr$—$Ti$—E is the zero plane for antimony, and the amount of antimony increases toward the apex $Sb$. And likewise, the plane or side $Cr$—$Ti$—$Sb$ is the zero plane for the electro-positive element, which increases toward the apex E. Each of the four components is thus pictured as increasing from a zero base to a maximum at the apex opposite such base plane. In such a system, a proportion of one atom of chromium to two atoms of the electro-positive and zero of titanium and of antimony, falls at the point $a$, which is one molecule or atomic unit removed from the zero base for the chromium, and two atom units removed from the zero base of the electro-positive element, and is on the tetrahedral edge between the zero base planes for titanium and for antimony. With one atom of chromium, two of the electro-positive element, and the titanium and the antimony varying between zero and maximum, this will be represented by the imaginary plane $a$—$Sb$—$Ti$, which cuts the tetrahedron slantingly from a point on its edge down to the base at the rear. Again, with one atom unit of chromium and one of titanium, and zero of antimony and the electro-positive element, the point $b$ is shown on the diagram, and with one atom unit of chromium, one of titanium and the antimony and the electro-positive element varying between zero and maximum, the imaginary plane $b$—E—$Sb$ is indicated. Again, with one atom unit of chromium and one of antimony and zero titanium and electro-positive element, the point $c$ on the remaining edge of the tetrahedron is located, and with one unit of chromium, one of antimony, and the titanium and electro-positive element varying between zero and maximum, the imaginary bounding plane C—$Ti$—E is located. The three aforesaid imaginary planes thus define a range indicated by the solid figure whose base is $Ti$—E—$Sb$ and whose apex $d$, this range graphically representing a small tetrahedron in the total tetrahedron range of all possible combinations, and being shown isolatedly at Figure 2, and indicating by way of example, a practical range of composition ratios for desirable pigment production. In an analogous manner, except that the proportions are given in weight per cent instead of molecular proportions, Fig. 3 shows as a tetrahedral graph illustrative desirable proportion ranges between the particular components $CrO_3$, $Na_2O$, $Sb_2O_5$ and $TiO_2$. The general variable range follows within the boundaries of a tetrahedral portion whose base is $$Na_2O—Sb_2O_5/2—TiO_2$$

and whose apex is $d$, and is shown detachably for clearness in Fig. 4. The apex $d$ corresponds to the maximum limit of $CrO_3$ in the compound, namely 24.8% by weight.

Some examples of desirable mixtures are as follows:

I. 9.5 parts of $TiO_2$, 0.35 of $Sb_2O_3$, 0.15 of $CrO_3$ and 0.12 of NaOH.

II. 8.25 parts $TiO_2$, 1.5 of $Sb_2O_3$, 0.25 of $CrO_3$ and 0.20 of NaOH.

III. 7.0 parts $TiO_2$, 2.1 of $Sb_2O_3$, 0.9 of $CrO_3$ and 0.72 of NaOH.

IV. 6 parts $TiO_2$, 2.8 of $Sb_2O_3$, 1.2 of $CrO_3$ and 0.96 of NaOH.

V. 6.0 parts of $TiO_2$, 4.5 of $Sb_2O_3$, 0.5 of $CrO_3$ and 0.4 of NaOH.

VI. 5.7 parts $TiO_2$, 4 of $Sb_2O_3$, 0.3 of $CrO_3$ and 0.24 of NaOH.

VII. 4.75 parts $TiO_2$, 5 of $Sb_2O_3$, 0.25 of $CrO_3$ and 0.2 of NaOH.

VIII. 3.75 parts $TiO_2$, 6.0 of $Sb_2O_3$, 0.25 of $CrO_3$, and 0.2 of NaOH.

IX. 1.9 parts $TiO_2$, 8 of $Sb_2O_3$, 0.09 of $CrO_3$, and 0.07 of NaOH.

X. 3 parts $TiO_2$, 6.5 of $Sb_2O_3$, 0.5 of $CrO_3$, and 0.4 of NaOH.

XI. 9.25 parts $TiO_2$, 0.65 of $NaSbO_3$, and 0.1 of $CrO_3$.

XII. 8 parts $TiO_2$, 1.75 of $NaSbO_3$, and 0.25 of $CrO_3$.

XIII. 6.0 parts $TiO_2$, 3.0 of $NaSbO_3$ and 1 of $CrO_3$.

XIV. 5 parts $TiO_2$, 4 of $NaSbO_3$ and 1 of $CrO_3$.

XV. 4.75 parts $TiO_2$, 5 of $NaSbO_3$ and 0.25 of $CrO_3$.

XVI. 3.75 parts $TiO_2$, 6 of $NaSbO_3$ and 0.25 of $CrO_3$.

XVII. 4.0 parts $TiO_2$, 5.5 of $NaSbO_3$ and 0.5 of $CrO_3$.

XVIII. 8.85 parts $TiO_2$, 0.8 of $Sb_2O_3$, 0.26 of $MgCO_3$ and 0.25 of $CrO_3$.

XIX. 8.81 parts $TiO_2$, 0.8 of $Sb_2O_3$, 0.2 of $SnO_2$ and 0.25 of $CrO_3$.

XX. 8.69 parts $TiO_2$, 0.8 of $Sb_2O_3$, 0.371 of $SrCO_3$ and 0.25 of $CrO_3$.

XXI. 8.63 parts $TiO_2$, 0.8 of $Sb_2O_3$, 0.32 of CdO and 0.25 of $CrO_3$.

XXII. 8.4 parts $TiO_2$, 0.8 parts $Sb_2O_3$, 0.8 of $PbCrO_4$.

XXIII. 8.8 parts $TiO_2$, 0.8 of $Sb_2O_3$, 0.29 of $NiCO_3$, and 0.25 of $CrO_3$.

XXIV. 8 parts $TiO_2$, 0.8 of $Sb_2O_3$, 2 of $Al_2O_3$ and 0.25 of $CrO_3$.

XXV. 20 parts $TiO_2$, 2.4 of $Sb_2O_3$, 0.3 of $CrO_3$ and 0.8 of $Na_2SiO_3$.

XXVI. 100 parts of tile body composition (comprising kaolin, Feldspar, etc.), 3.56 of $TiO_2$, 0.42 $Sb_2O_3$, and 0.02 of $Cr_2O_3$.

XXVII. 10 parts of china clay, 10 of $TiO_2$, 1.2 of $Sb_2O_3$, and 0.15 $CrO_3$.

Such pigment composition thus may be incorporated and fired in a ceramic body to the development of the yellow color in situ, or the pigment as produced per se may be employed in ceramic bodies, coatings, or in desired usages in cements, rubber, paints, etc., such pigment being particularly desirable and advantageous in any of these relations, by reason of its inertness and permanence.

Other modes of applying the principle of the invention may be employed, change being made as regards the details described, provided the features stated in any of the following claims, or the equivalent of such, be employed.

I therefore particularly point out and distinctly claim as my invention:—

1. A pigment, comprising the reaction products of titanium, antimony, chromium, in oxygen-containing compound form, and a compound providing an element which is electro-positive to the aforementioned, the chromium not exceeding a ratio of one atom to each atom of titanium.

2. A pigment, comprising the reaction products of titanium, antimony, chromium, in oxygen-containing compound form, and a compound providing an element which is electro-positive to the aforementioned, the chromium not exceeding a ratio of one atom to each atom of antimony.

3. A pigment, comprising the reaction products of titanium, antimony, chromium, in oxygen-containing compound form, and a compound providing an element which is electro-positive to the aforementioned, the chromium not exceeding a ratio of one atom to two hydrogen equivalents of the electro-positive element.

4. A pigment, comprising the reaction products of titanium, antimony, chromium, in oxygen-containing compound form, and a compound providing an element which is electro-positive to the aforementioned, the chromium not exceeding a ratio of one atom to each atom of titanium and to each atom of antimony.

5. A pigment, comprising the reaction products of titanium, antimony, chromium, in oxygen-containing compound form, and a compound providing an element which is electro-positive to the aforementioned, the chromium not exceeding a ratio of one atom to each atom of antimony and to two hydrogen equivalents of the electro-positive element.

6. A pigment, comprising the reaction products of titanium, antimony, chromium, in oxygen-containing compound form, and a compound providing an element which is electro-positive to the aforementioned, the chromium not exceeding a ratio of one atom to each atom of antimony and to each atom of titanium and to two hydrogen equivalents of the electro-positive element.

7. A process of making a pigment, which comprises heating a mixture of compounds of titanium, antimony and chromium, in oxygen-containing compound form, in the presence of a compound providing an element which is electro-positive to the aforementioned.

8. A process of making a pigment, which comprises heating a mixture of compounds of titanium, antimony, and chromium, in oxygen-containing compound form, in the presence of a sodium compound.

9. A process of making a pigment, which comprises mixing at least one of the components titanium, antimony, chromium, in oxygen-containing compound form, with a ceramic raw material, and finally heating in surface contact with the remainder of said components, an element electro-positive to the aforementioned components being present in available compound form.

10. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to each atom of titanium.

11. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to each atom of antimony.

12. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to two hydrogen equivalents of the electro-positive element.

13. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to each atom of titanium and each atom of antimony.

14. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to each atom of antimony and to two hydrogen equivalents of the electro-positive element.

15. A process of making a pigment, which comprises heating a mixture of compounds of titanium, antimony and chromium, in oxygen-containing compound form, in the presence of a compound providing an element which is electro-positive to the aforementioned, the chromium not exceeding a ratio of one atom to each atom of antimony and to each atom of titanium and to two hydrogen equivalents of the electro-positive element.

CARL J. HARBERT.